United States Patent [19]
Reinhart

[11] Patent Number: 5,645,868
[45] Date of Patent: Jul. 8, 1997

[54] DRIVE APPARATUS FOR AN INJECTION UNIT

[75] Inventor: William A. Reinhart, Georgetown, Ohio

[73] Assignee: Cincinnati Milacron Inc., Cincinnati, Ohio

[21] Appl. No.: 560,129

[22] Filed: Nov. 17, 1995

[51] Int. Cl.⁶ .................................................. B29C 45/76
[52] U.S. Cl. ........................... 425/145; 425/149; 425/342
[58] Field of Search ..................................... 425/145, 149, 425/542

[56] References Cited

U.S. PATENT DOCUMENTS

| | | | |
|---|---|---|---|
| 4,758,391 | 7/1988 | Shimizu et al. | 264/40.5 |
| 4,961,696 | 10/1990 | Yamamura | 425/149 |

Primary Examiner—Tim Heitbrink
Attorney, Agent, or Firm—Stephen H. Friskney

[57] ABSTRACT

An electro-mechanical drive apparatus uses a single motor and three one-way clutches to provide both injection and extruder functions in the injection unit of an injection molding machine. When engaged, the first one-way clutch couples the feed screw to the frame of the injection unit, the second clutch couples the drive motor to the feed screw, and the third clutch couples the drive motor to the ball screw mechanism. During rotation of the drive motor in a forward (injection) direction, (a) the third one-way clutch engages, rotating the ball screw mechanism which results in forward movement of the feed screw; (b) the second one-way clutch slips; and (c) the first one-way clutch engages to prevent rotation of the feed screw as it moves forward. When the drive motor is rotated in a reverse (extrusion) direction, (a) the second one-way clutch engages, rotating the feed screw, (b) the first one-way clutch slips, and (c) the third one-way clutch slips, allowing rotation of the ball screw mechanism commensurate with the rearward movement of the feed screw. Three versions of the drive apparatus, each having its own specific advantages, are disclosed: (I) a double shaft motor mounted adjacent separate drive couplings for extrusion (feed screw rotation) and injection (ball screw rotation—feed screw translation); (II) a single shaft motor connected by a mechanical coupling to a transmission that alternately drives the feed screw and ball screw; and (III) a hollow (or double) shaft motor axially aligned with the feed screw and ball screw mechanism, so that one rotor shaft is coupled to the feed screw and the shaft is coupled to the ball screw mechanism.

8 Claims, 4 Drawing Sheets

DRIVE APPARATUS FOR AN INJECTION UNIT

BACKGROUND OF THE INVENTION

1. Field of the Invention

The present invention relates generally to the injection unit of an injection molding machine and, more particularly, to a drive apparatus in the injection unit that accomplishes both the injection and extruder functions.

2. Description of the Related Art

The injection unit of an injection molding machine provides essentially two functions during the course of a normal cycle of operation; namely, injection and extruder. The injection function occurs when the feed screw is moved forward linearly (without rotation) to force plastic melt into the mold. The extruder function is accomplished when the feed screw is rotated to plasticize additional material for the next shot. As the feed screw is rotated during the extruder function, the plastic melt is gradually forced past the end of the screw, creating a pressure or force to move the screw rearward to its pre-injection position as the melt accumulates.

Both the injection and extruder functions require an associated drive apparatus in the injection unit. In hydraulic machines, the movement for the injection function is typically performed by a hydraulic cylinder, while the rotation of the feed screw for extruder run is normally accomplished by a hydraulic motor. More recently, electric motors combined with mechanical systems have been used as the direct power source in the injection unit. Some prior art electric systems have used separate motors for each function; i.e., one motor for rotating the feed screw and a second motor in combination with a mechanism, such as a ball screw, to convert rotary motion into the linear movement required for injection. Other electric machines use a single motor with a massive, complex system of brakes, clutches, and driven elements to accomplish the injection and extruder functions alternately.

While the two motor approach allows fully independent control, the "single" motor system can still accomplish the necessary functions while also providing the potential for a more economical system. However, prior art systems using the single motor concept have required power transmission systems that are mechanically complicated, often requiring duplicate components that eliminate the cost saving potential. Furthermore, such systems have not been able to restrict rotation of the feed screw during injection without adding more costly components. Obviously, the complexity of such systems negatively affects the reliability of the injection unit. Since injection molding machines normally operate in a continuous (automatic) mode with the injection and extruder functions often occurring every few seconds, durability and reliability of the drive apparatus is a key concern.

Accordingly, it is an object of the present invention to provide a drive apparatus that is simple in construction and effectively provides the extruder and injection functions by a single motor.

SUMMARY OF THE INVENTION

Briefly stated, the present invention is directed to the drive apparatus of an injection unit in an injection molding machine. The drive apparatus alternately provides rotation of the feed screw and operation of a means of converting rotation to linear movement, such as a ball screw mechanism, in order to perform the extruder and injection functions. The drive apparatus includes a drive motor, a first one-way clutch between the feed screw and a fixed element in the machine frame, a second one-way clutch between the drive motor and the feed screw, and a third one-way clutch between the drive motor and the ball screw mechanism.

During operation of the injection unit, the drive motor is rotated in a forward (clockwise) direction to perform the injection function, and a reverse (counterclockwise) direction for the extruder function. During forward rotation of the drive motor, (a) the third one-way clutch is engaged, rotating the ball screw mechanism which results in forward (linear) movement of the feed screw to accomplish the actual injection of plastic melt; (b) the second one-way clutch slips; and (c) the first one-way clutch is engaged to prevent rotation of the feed screw during injection of the plastic melt. During reverse rotation, (a) the second one-way clutch is engaged, rotating the feed screw at a predetermined speed to plasticize material; (b) the first one-way clutch slips; and (c) the third one-way clutch slips, allowing free rotation of the ball screw mechanism commensurate with the rearward movement of the feed screw as the shot of plastic accumulates in front of the screw.

If desired, a small motor or brake mechanism can be included in the drive apparatus to control the rotation of the ball screw as the feed screw moves rearwardly during the extruder function, thus controlling the back pressure of the plastic melt.

Three embodiments of the drive apparatus, each having its own specific advantages, are disclosed: (I) a double shaft motor mounted adjacent separate drive couplings for the extruder (feed screw rotation) and injection (ball screw rotation—feed screw translation); (II) a single shaft motor mechanically coupled to a transmission that alternately drives the feed screw and ball screw; and (III) a hollow (or double) shaft motor axially aligned with the feed screw and ball screw mechanism, so that one end of the rotor is coupled to the feed screw and the other end of the rotor is coupled to the ball screw mechanism. Overall, the present invention provides a compact drive system for a single motor in the injection unit; this improves reliability and allows faster response over systems requiring a shift mechanism. Advantages of the specific embodiments include: version "II" uses a "standard" motor; version "III" has simplified mounting and coupling to the drive motor; version "I" uses a more economical motor than "II" and has a simpler clutch design as compared with "II".

DESCRIPTION OF THE PREFERRED EMBODIMENT

Figure 1:
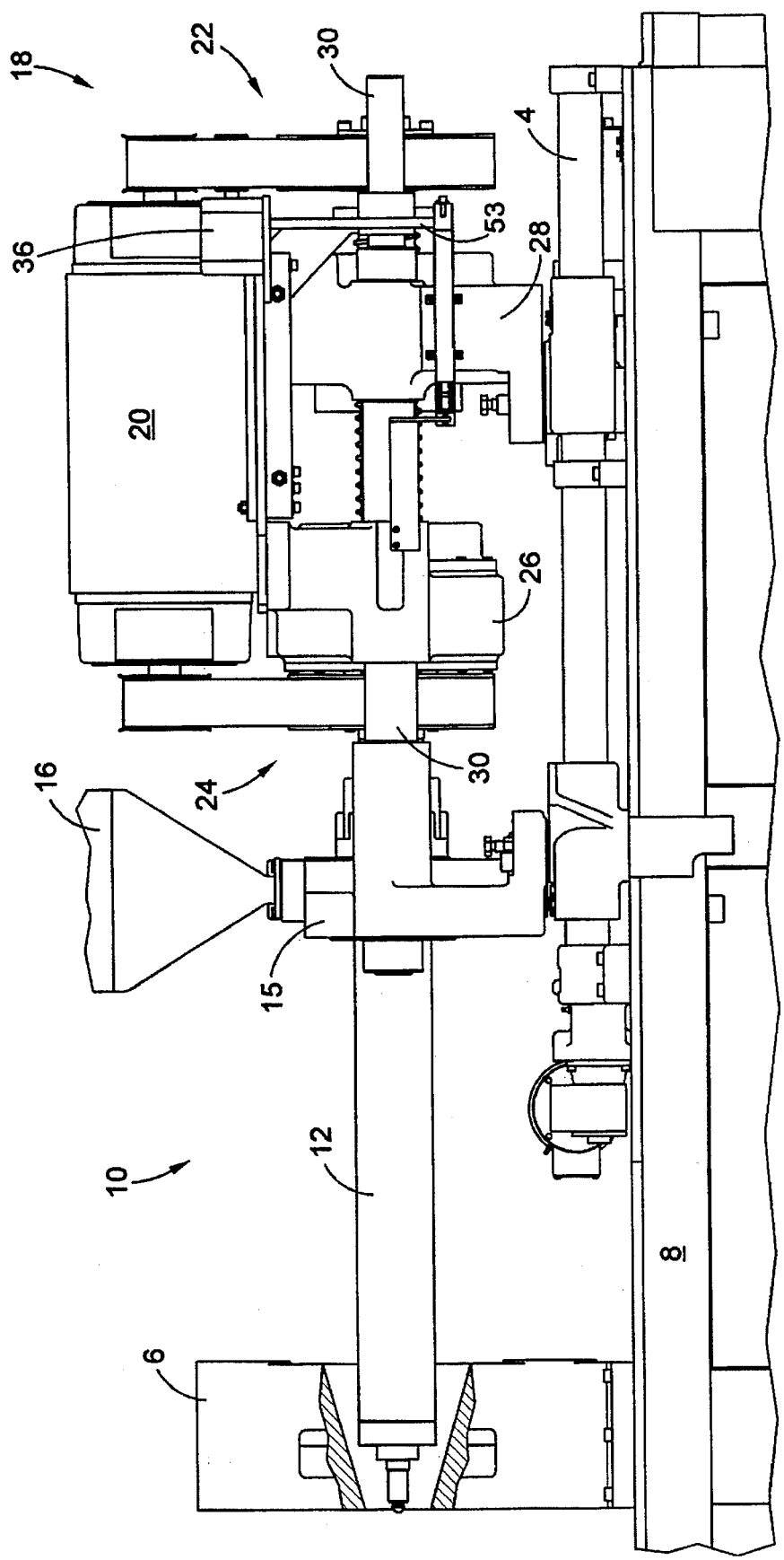
FIG. 1 is a side elevational view of the injection unit of an injection molding machine, including a drive apparatus according to the present invention.

The present invention will be described in the context of an injection unit used in connection with a typical injection molding machine. As shown in FIG. 1, an injection unit 10 is carried by horizontal support rods 4 attached to a base 8 of the injection molding machine. The injection unit 10 is adapted to move along the support rods 4 for purposes of positioning, such as making connection with a mold (not shown) attached to stationary platen 6.

The primary components of the injection unit 10 include a barrel 12 containing a feed screw 14 (FIG. 2) that works to plasticize thermoplastic material that enters the barrel 12 through housing 15 from hopper 16. The operative functions of injection unit 10 are initiated by a drive assembly 18. The drive assembly 18 of injection unit 10 includes an electric drive motor 20, injection drive coupling 22, extruder drive coupling 24, bearing housing 26, support housing 28, guide rods 30, and ball screw 32 with ball nut 34, see FIGS. 1&2. As will be described in greater detail in the following paragraphs, the drive assembly 18 operates to rotate the feed screw 14 to plasticize the material during the extruder function, and to generate translational movement of the feed screw 14 to perform the injection function. Preferably, an auxiliary motor 36 is provided to control the back pressure of the plastic melt during the extruder function.

Figure 2:
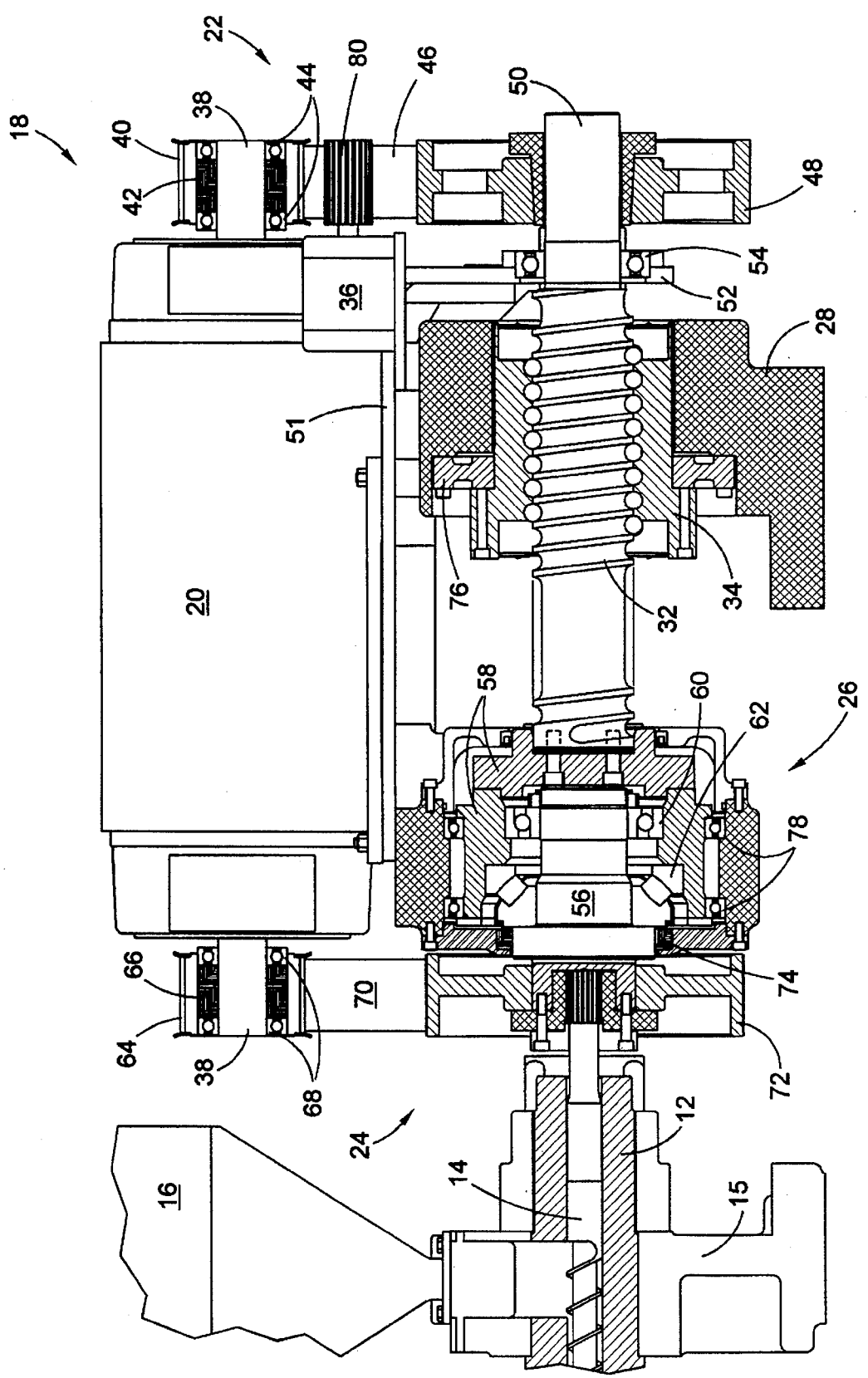
FIG. 2 is an enlarged view, partially in section, showing the drive apparatus of the injection unit illustrated in FIG. 1 in greater detail.

Referring more particularly to FIG. 2, the drive assembly 18 includes an injection drive coupling 22 that connects the motor 20 to the ball screw 32. Mounted on the shaft 38 of motor 20 are a one-way clutch 42 and two ball bearing assemblies 44, which collectively serve to support and engage a pulley 40. As will be more fully described later, while the motor 20 is capable of rotation in either direction, the one-way clutch 42 acts to allow rotation of the pulley 40 in one direction only. In the context of this disclosure, each element described as a "one-way clutch" is preferably a mechanical cam type clutch made to engage a rotating cylindrical element with a surrounding member for one direction of rotation; there is essentially no resistance from the clutch when the element is rotated in the opposite direction. Morse Industrial, Emerson Power Transmission Corp. is a well known supplier of this type of clutch.

A second pulley 48 is mounted on the shaft end 50 of ball screw 32. Connecting the pulleys 40,48 is a drive belt 46. In order to further stabilize the shaft end 50 of ball screw 32, a support 52 and bearing 54 are provided. The support 52 extends from a motor mounting plate 51. The motor mounting plate 51 connects directly to the bearing housing 26 and is configured to travel above the support housing 28. As shown, the motor 20 sits directly on top of the mounting plate 51. Note that the plate 51 preferably includes extensions 53 (FIG. 1) that connect with support rods 30 to provide further stability.

The drive assembly 18 also includes an extruder drive coupling 24 to connect the motor 20 to the feed screw 14. In a manner similar to that described above for the injection drive coupling 22, the extruder drive coupling 24 includes a pulley 64 mounted on motor shaft 38 through a one-way clutch 66 and bearings 68. A second pulley 72 in extruder drive coupling 24 connects to feed screw coupling 56 and is driven by pulley 64 through a drive belt 70.

The ball nut 34 is carried within support housing 28 and is restrained from rotation by its attachment to housing 28 through a load cell 76. With the driven end 50 of ball screw 32 connecting to pulley 48, the opposite end of the screw 32 connects to ball screw coupling elements 58 within bearing housing 26. The elements 58 are free to rotate within housing 26 and are configured to transmit linear (horizontal) force from the ball screw 32 to the feed screw coupling 56. Thrust bearings 62 and ball bearings 78 and 60 are provided to facilitate the force transmission between the feed screw coupling 56 and ball screw 32.

The operation of the drive assembly 18 as shown in FIGS. 1&2 will now be described. To initiate the extruder function, motor 20 is activated to rotate in a counterclockwise direction. This rotation of motor shaft 38 causes one-way clutch 66 to engage, driving pulley 64 and, consequently, pulley 72 by virtue of drive belt 70. The rotation of pulley 72 imparts like rotation to feed screw coupling 56 which rotates feed screw 14. As the feed screw 14 is rotated, material supplied from hopper 16 feeds through housing 15 and is plasticized within barrel 12. The rotation of feed screw 14 also serves to advance material toward the nozzle (discharge) end of barrel 12, causing the pressure of the melt to increase at the end of the screw 14 as the charge of material begins to accumulate. When the pressure of the plastic melt reaches a certain level, it will begin to force feed screw 14 rearward, thereby moving the entire drive assembly 18 to the rear of injection unit 10 as well (except support housing 28 which remains stationary). Specifically, the rearward movement of feed screw 14 applies a force to ball screw 32 through coupling 58, causing ball screw 32 to move likewise to the rear; as the ball screw 32 is pushed through ball nut 34 it rotates.

The rate of rearward movement of the feed screw 14 (and ball screw 32) can be controlled by the auxiliary motor 36 which contacts belt 46 through a drive pulley 80. The motor 36 can be used as a brake to slow the movement of ball screw 32, which slows the rearward movement (but not the rotation) of feed screw 14, thereby increasing the back pressure of the plastic melt. Alternatively, the motor 36 can be used to speed up the movement of screw 32, which increases the rate at which the feed screw moves back, thereby decreasing the back pressure of the melt.

As the motor 20 rotates in a counterclockwise direction during the extruder function, the one-way clutch 42 slips on shaft 38 so that ball screw 32 is free to rotate in the manner described above. Similarly, one-way clutch 74 slips so as not to interfere with the rotation of feed screw 14 and the associated plasticizing of the material in the barrel 12. The extrusion function is complete when a sufficient charge of plastic melt is accumulated in front of the feed screw 14, as required to fill the cavity of the mold mounted on the stationary platen 6.

To initiate the injection function, the motor 20 is rotated in a clockwise direction; as a result, one-way clutch 42 is engaged on shaft 38, rotating pulley 40 and pulley 48 through drive belt 46. Auxiliary motor 36 is not activated during injection and is allowed to "free-wheel" against the drive belt 46. The rotation of pulley 48 is imparted to ball screw 32 causing the screw 32 to advance through ball nut 34 which is constrained by support housing 28. The translational (linear) movement of screw 32 is imparted to the feed screw coupling 56 through the bearings 60,62 and coupling 58 in housing 26. Actually, since they are components in the same assembly, the motor 20, injection coupling 22, extruder coupling 24, and bearing housing 26, all have translational movement along with the ball screw 32 as the feed screw 14 is moved linearly in the barrel 12.

The forward movement of feed screw 14 causes the plastic melt accumulated at the end of the barrel to be forced out of the barrel and into the mold cavity. During injection, one-way clutch 74 is caused to be engaged with feed screw coupling 56, so that the feed screw 14 cannot rotate in a clockwise direction when the feed screw 14 is moved forward to inject the plastic melt. (The force of the plastic melt on the flight of the feed screw 14 creates a torque that tends to rotate feed screw 14.) Upon completion of the injection function, the injection unit 10 is ready to begin another extrusion function as described previously.

Figure 3:
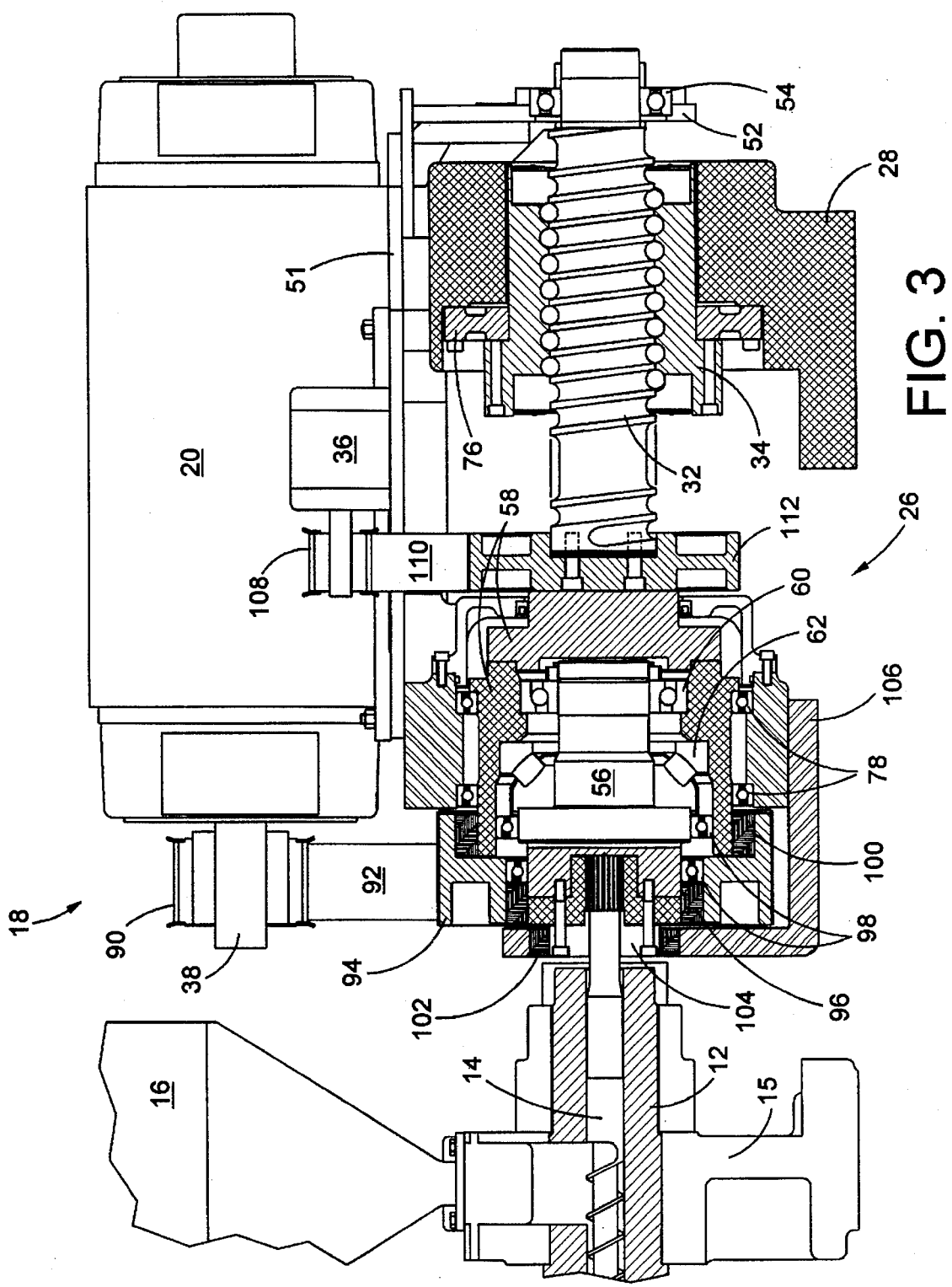
FIG. 3 is a view similar to FIG. 2, showing a second embodiment of a drive apparatus according to the present invention.

An alternate embodiment of the drive assembly 18 is shown in FIG. 3, with parts serving the same function as the previous embodiment being denoted by identical reference numerals. In this embodiment, the drive motor 20 has a single output shaft 38. On shaft 38 is mounted a pulley 90 that connects by a drive belt 92 to a second pulley 94. A one-way clutch 96 is disposed between pulley 94 and feed screw coupling 56; a second one-way clutch 100 is disposed between the pulley 94 and ball screw coupling elements 58. Preferably, bearings 98 are also disposed between the feed screw coupling 56 and the pulley 94, and between the feed screw coupling 56 and ball screw 58, as shown. The third one-way clutch 102 is disposed between a collar 104 connected to feed screw coupling 56, and a housing extension 106 that is attached to bearing housing 26.

During the extruder function, the shaft 38 of motor 20 has a counterclockwise rotation, thereby rotating pulley 94 in like manner by virtue of pulley 90 and connecting drive belt 92. With the rotation of pulley 94, clutch 96 is engaged, rotating coupling 56 which causes the feed screw 14 to rotate and plasticize the thermoplastic material in the same manner as described above for the first embodiment. In the apparatus shown in FIG. 3, clutch 100 slips, allowing the ball screw couplings 58 (and ball screw 32) to rotate freely. The feed screw 14 and drive assembly 18 are forced to the rear as the plastic melt accumulates and is pressurized in front of the feed screw 14. The back pressure of the melt is controlled again by auxiliary motor 36 which connects to ball screw 32 by a pulley 112, drive belt 110 and pulley 108. Auxiliary motor 36 can be used to speed up or slow down rotation of ball screw 32 to obtain the desired back pressure on the melt as described previously.

During the injection function, the motor 20 rotates shaft 38 in a clockwise direction, rotating pulley 94 in like manner by virtue of drive belt 92 and pulley 90. The clockwise rotation of pulley 94 engages clutch 100 imparting rotation to ball screw 32 by virtue of the coupling elements 58. The rotation of ball screw 32 causes it to move forward through ball nut 34 forcing the feed screw 14 and connecting components to move forward as well. During the injection function, one-way clutch 96 slips and clutch 102 is engaged to prevent the clockwise rotation of the feed screw 14 during injection.

Figure 4:
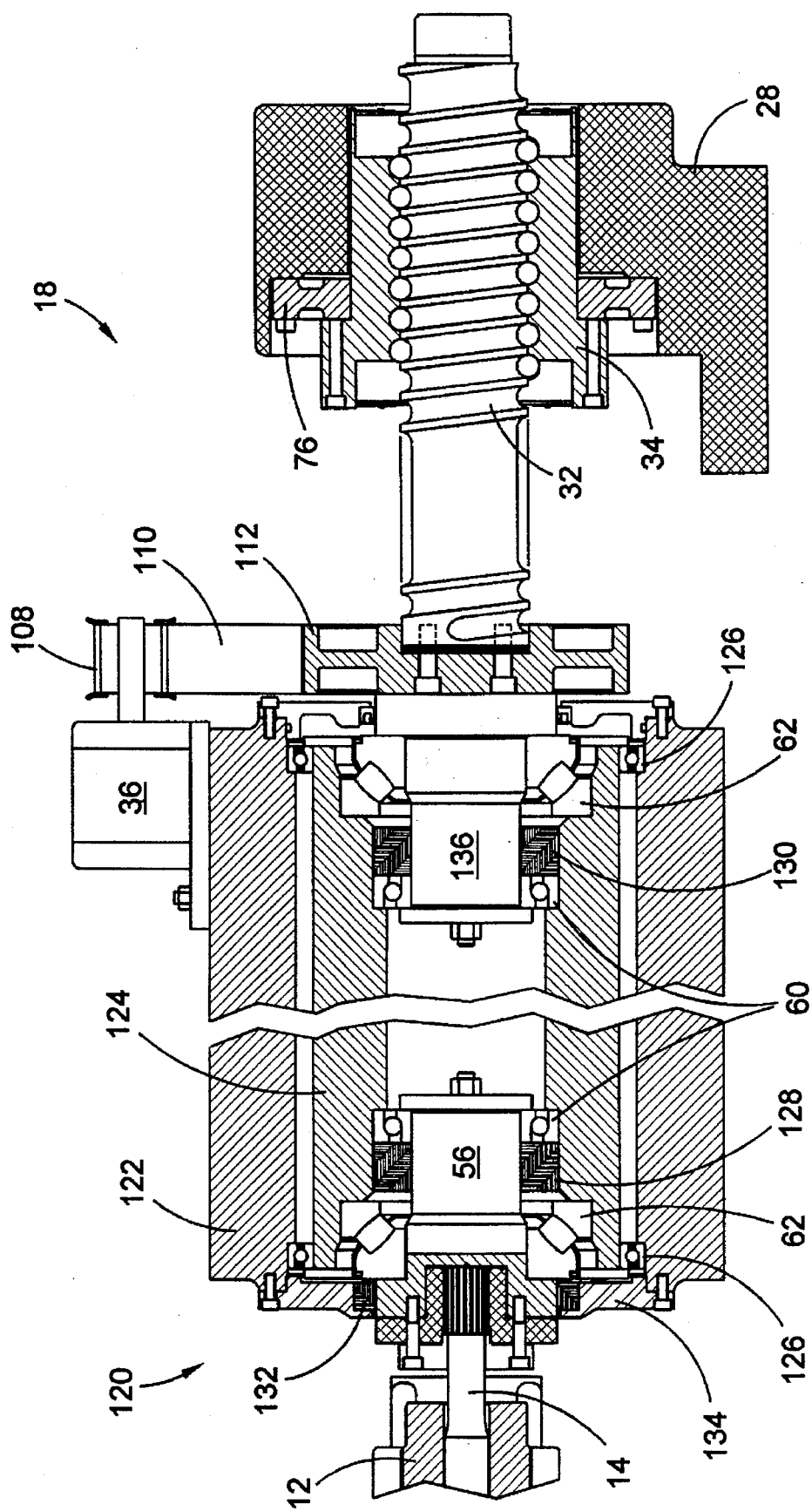
FIG. 4 is a view similar to FIGS. 2 and 3 showing a third embodiment of a drive apparatus according to the present invention.

A second alternate embodiment of the drive assembly 18 is shown in FIG. 4. This configuration for the apparatus does not include a bearing housing as with previous embodiments, but rather has a hollow shaft motor 120 to contain the bearings and related drive coupling elements. More particularly, the hollow shaft motor 120 has a cylindrical stator 122 and cylindrical rotor 124. The rotor is actually of conventional construction for this type of motor, as is familiar to those skilled in the art, and includes bearings 126 to maintain the proper spacing between the stator 122 and rotor 124. As with the previously described embodiments, the drive apparatus shown in FIG. 4 includes three one-way clutches 128,130, and 132. The clutch 128 is disposed within the rotor 124 around feed screw coupling 56, with bearings 60,62 provided to transmit the forces occurring during operation. Similarly, clutch 130 is disposed within the rotor 124 around ball screw coupling 136. With this construction, the ball screw coupling 136 and feed screw coupling 56 are in axial alignment within rotor 124. The feed screw coupling 56 is also provided with bearings 60,62 to support its rotation and transmit related forces. Clutch 132 is disposed between the feed screw coupling 56 and a fixed housing element 134 that connects to the stator 122 of hollow shaft motor 120.

The use of a hollow shaft motor for this embodiment enables a shorter overall construction since many of the elements of the drive couplings can be housed within the rotor. However, if the length of the assembly is not a primary concern, a standard double shaft motor could be used in place of the hollow shaft motor. The double shaft motor remains in alignment with the feed screw and ball screw, but the feed screw coupling and ball screw coupling are configured to engage one-way clutches on the respective motor shafts. Other elements of the drive apparatus would be similarly reconfigured to adapt to the double shaft motor.

The extrusion function is initiated by counterclockwise rotation of the rotor 124. With this rotation, clutch 128 is engaged, causing feed screw coupling 56 to rotate the feed screw 14. Clutch 132 slips so as not to interfere with the rotation of feed screw 14. As feed screw 14 rotates, it plasticizes material, generating pressure at the front of the feed screw 14 which causes screw 14 to move backward so that a charge of material accumulates at the discharge end of the barrel 12. As described for the other embodiments, the force causing the rearward movement of screw 14 also causes a corresponding movement of the motor 120 and ball screw 32 since all these parts are connected. The movement of ball screw 32 through ball nut 34 causes the screw 32 to rotate. The rate of rotation of ball screw 32 can be controlled by auxiliary motor 36 through drive pulley 108, belt 110 and pulley 112 which connects between the ball screw coupling 136 and ball screw 32.

For the injection function, the rotor 124 turns in a clockwise direction engaging clutch 130, thereby causing ball screw coupling 136 and ball screw 32 to rotate. This rotation of ball screw 32 advances the screw 32, motor 120 and feed screw 14 in a forward direction to perform the injection. During the clockwise rotation of rotor 124, clutch 128 slips while clutch 132 is engaged to prevent rotation of the feed screw 14.

While the invention has been illustrated in some detail according to the preferred embodiment shown in the accompanying drawings, and while the preferred embodiment has been described in some detail, there is no intention to thus limit the invention to such detail. On contrary, it is intended to cover all modifications, alterations, and equivalents falling within the spirit and scope of the appended claims. For example, although the drive couplings are generally described as belts and pulleys, other mechanical couplings, such as suitable gearing, can be used to perform the same function.

What is claimed is:

1. A molding machine comprising, an injection unit having a feed screw, a ball screw mechanism, a frame, a drive motor and a transmission means for alternately rotating the feed screw and the ball screw mechanism to perform respectively extrusion and injection functions in the injection unit, the transmission means comprising:

(a) a first one-way clutch interposed between the feed screw and the frame of the injection unit, (b) a second one-way clutch interposed between the drive motor and the feed screw, (c) a third one-way clutch interposed between the drive motor and the ball screw mechanism, such that when the drive motor is operated in a forward direction, (i) the third one-way clutch is engaged, rotating the ball screw mechanism which results in forward translational movement of the feed screw, (ii) the second one-way clutch slips, and (iii) the first one-way clutch is engaged to prevent rotation of the feed screw;

when the drive motor is operated in a reverse direction, (iv) the second one-way clutch is engaged, rotating the feed screw (v) the first one-way clutch slips, and (vi) the third one-way clutch slips, allowing rotation of the ball screw mechanism commensurate with rearward translational movement of the feed screw.

2. The molding machine claimed in claim 1 further comprising means for controlling the rotation of the ball screw mechanism during the translational movement of the feed screw during extrusion, thereby affecting control of back pressure in the injection unit.

3. The molding machine claimed in claim 2 wherein the means for controlling rotation of the ball screw mechanism includes an auxiliary motor mechanically coupled to the ball screw mechanism.

4. The molding machine claimed in claim 1 wherein the transmission means further includes a drive belt and pulleys to connect the drive motor to the feed screw and to connect the drive motor to the ball screw mechanism.

5. The molding machine claimed in claim 1 wherein the rotor of the drive motor is positioned between and in axial alignment with the feed screw and the ball screw mechanism, and the transmission means further includes a feed screw coupling between the rotor and the feed screw and a ball screw coupling between the rotor and the ball screw.

6. The molding machine claimed in claim 5 wherein the rotor of the drive motor is hollow, with the feed screw coupling, the second one-way clutch, the ball screw coupling, and the third one-way clutch located at least partially within the rotor.

7. The molding machine claimed in claim 1 wherein the drive motor has an output shaft at each end of the rotor, with the second one-way clutch positioned to engage one rotor shaft, and the third one-way dutch positioned to engage the shaft at the opposite end of the rotor.

8. The molding machine claimed in claim 1 wherein the drive motor has a single rotor output shaft; and the transmission means further includes a drive belt, a first pulley on the rotor shaft, a second pulley, a feed screw coupling, and a ball screw coupling; wherein the feed screw coupling and the a ball screw coupling are concentric with the second pulley, such that the second one-way clutch is located between the second pulley and the feed screw coupling, and the third one-way clutch is located between the second pulley and ball screw coupling.

* * * * *